United States Patent [19]
Maistre

[11] 4,219,597
[45] Aug. 26, 1980

[54] THREE-DIMENSIONAL, MULTI-DIRECTIONAL STRUCTURE

[75] Inventor: Michel Maistre, Bordeaux, France

[73] Assignee: Societe Europeenne de Propulsion, France

[21] Appl. No.: 22,171

[22] Filed: Mar. 20, 1979

[30] Foreign Application Priority Data

May 5, 1978 [FR] France .................................. 78 13415

[51] Int. Cl.$^2$ .............................................. B32B 5/12
[52] U.S. Cl. .................................. 428/105; 428/357; 428/364; 428/398; 428/408
[58] Field of Search ............... 428/292, 294, 295, 297, 428/299, 302, 357, 364, 367, 408, 398, 105

[56] References Cited

U.S. PATENT DOCUMENTS

| | | | |
|---|---|---|---|
| 3,949,126 | 4/1976 | Crawford | 428/113 |
| 4,131,708 | 12/1978 | Moores et al. | 428/408 |
| 4,168,337 | 9/1979 | Maistre | 428/105 |

*Primary Examiner*—James J. Bell
*Attorney, Agent, or Firm*—Staas & Halsey

[57] ABSTRACT

The structure comprises more than four bundles each constituted by a plurality of regularly spaced, parallel, rectilinear elements, the directions of at least five of said bundles being oriented parallel to at least five of the ten directions defined by the lines connecting the non-contiguous vertexes of a parallelepiped in two's and the bundles taken in three's not constituting a system in which each bundle is perpendicular to the other two.

17 Claims, 9 Drawing Figures

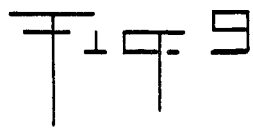
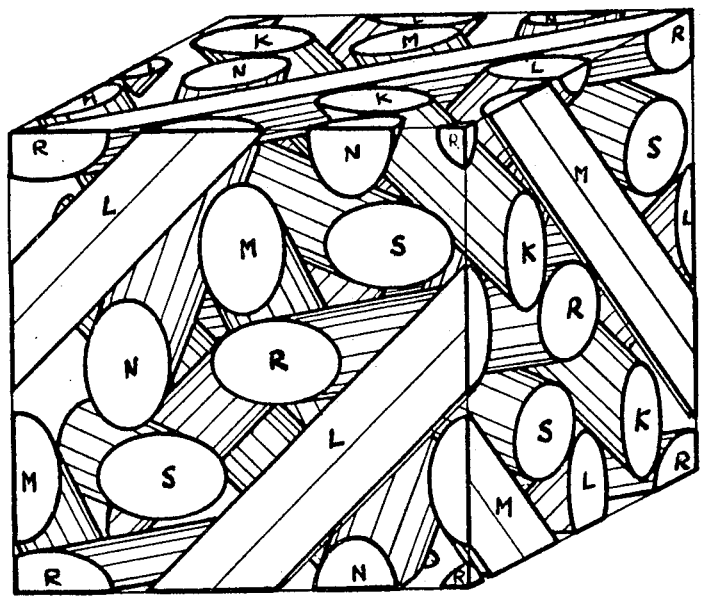

THREE-DIMENSIONAL, MULTI-DIRECTIONAL STRUCTURE

The present invention relates to a three-dimensional, multi-directional structure.

The advantage of three-dimensional multi-directional structures in the production of composite materials of which they constitute the reinforcement is known. These materials are for example carbon-carbon composites, such as those described in French Pat. No. 2,276,916 and are used for making pieces having to be subjected to severe mechanical and thermal stresses, such as nozzles of solid propellant rockets, the nose tips of re-entry vehicles.

These structures are formed by the regular interlacing of at least three bundles each constituted by a plurality of parallel, regularly spaced, rectilinear elements, the directions of these various bundles being such that they are not all parallel to the same plane. In fact, if it was the case, whatever the number of bundles, it could only be a structure of laminated type which could in no case be qualified as three-dimensional structure, even if it attained a large thickness further to the superposition of a large number of sheets of elements. A laminate, however thick it is, is never more than a two-dimensional structure.

The purpose of the three-dimensional structures is to give the composite of which they constitute the reinforcement, a better spatial distribution of the properties than what is obtained in laminates and in particular a better cohesion. In fact, it is known that laminates present good mechanical properties only in the plane of the lamination and that they tend to delaminate, i.e. to break up further to the disconnection of two adjacent sheets which are bonded to each other only by the matrix.

Some three-dimensional, multi-directional structures as defined hereinabove already exist. The most well known is formed by the regular interlacing of three bundles (3D) making angles of 90° with one another so that it may be said that their directions are oriented like the three edges of a cube. This relatively simple texture does not satisfactorily attain the desired aim.

In fact, the reinforcement being disposed only in three directions, the spatial distribution of the properties of the composite of which the structure constitutes the reinforcement presents considerable variations between the highest values, which are obtained in the direction of the bundles and the lowest values, which are obtained in oblique directions with respect to the three bundles simultaneously. In addition the delaminations between sheets of elements of two of the bundles may still be produced further to the possibility of slide of a part of the stack of the sheets of these two bundles in the direction of and along the third bundle which does not constitute a real locking.

Another known three-dimensional multi-directional structure is constituted by the regular intersection of four bundles (4D) oriented like the four long diagonals of a cube, or, more generally, like the four long diagonals of a parallelepiped. This structure which is described in French Pat. No. 2,276,916 gives the composites of which it constitutes the reinforcement a better spatial distribution of the properties than the 3D structure due to the larger number of directions along which the properties of the composite have the highest values. The 4D structure further gives a radical protection against delamination as any contact surface between adjacent sheets has two bundles passing therethrough, making a certain angle therebetween and thus ensuring a true locking.

If it is desired to improve the spatial distribution of the properties further and tend towards the isotropy of the properties, or towards an adjusted anisotropy, it is necessary further to increase the number of bundles constituting the structure, but difficulties of geometric order are then encountered, which limit the total quantity of reinforcement which it is possible to dispose in a given volume.

"Volume content of reinforcement" designates the ratio between the volume of reinforcing elements and the apparent volume of the structure. For example; for structures made with identical elements of circular cross section, this volume content of reinforcement is 0.59 for a 3D structure and 0.68 for a 4D structure, this incidentally constituting a supplementary advantage of the 4D structure over the 3D structure.

Only one model of multi-directional structure with isotropic tendency comprising a number of bundles greater than four, is known at the present time, which model presents several variants. This model is derived from the 3D structure. It consists in adding to an assembly of three bundles making angles of 90° with one another, at least one and preferably four or eight bundles which are oblique with respect to the preceding ones. Structures with seven or eleven directions are thus obtained, which of course lead to a better spatial distribution of the properties of the composites than the preceding structure but which do not enable a high volume content of reinforcement to be attained due to the bulk of the triorthogonal base system. The latter does not combine harmoniously with the oblique bundles, this leading to distend it in exaggerated manner to disengage the passage of the elements of the oblique bundles which then only very partially occupy the place thus freed.

It is an object of the present invention to provide structures comprising a number of bundles higher than four and, despite this, presenting a high volume content of reinforcement.

This purpose is attained by a structure in which, according to the present invention, the directions of at least five bundles are oriented parallel to at least five of the ten directions defined by the lines connecting the non-contiguous vertexes of a parallelepiped in two's, and the bundles taken in three's do not constitute a system in which each bundle is perpendicular to the other two.

According to a particular feature of the structure according to the invention, said parallelepiped constitutes the unit cell of the structure.

The expression "unit cell of the structure" denotes here the smallest parallelepipedic volume which enables the mode of imbrication of the different elements to be defined and which is reproduced, equal to itself, by translation parallel to any one of its edges by a length equal to this edge.

Said ten directions correspond to the four long diagonals of the parallelepiped and to the six diagonals of its faces. Such an arrangement of the reinforcement makes it possible to obtain composites having a good spatial distribution of the properties at the same time as a high volume content of reinforcement.

The invention will be more readily understood on reading the following description with reference to the accompanying drawings, in which:

FIGS. 8 and 9 show two other 6D structures according to the invention.

Figure 1:
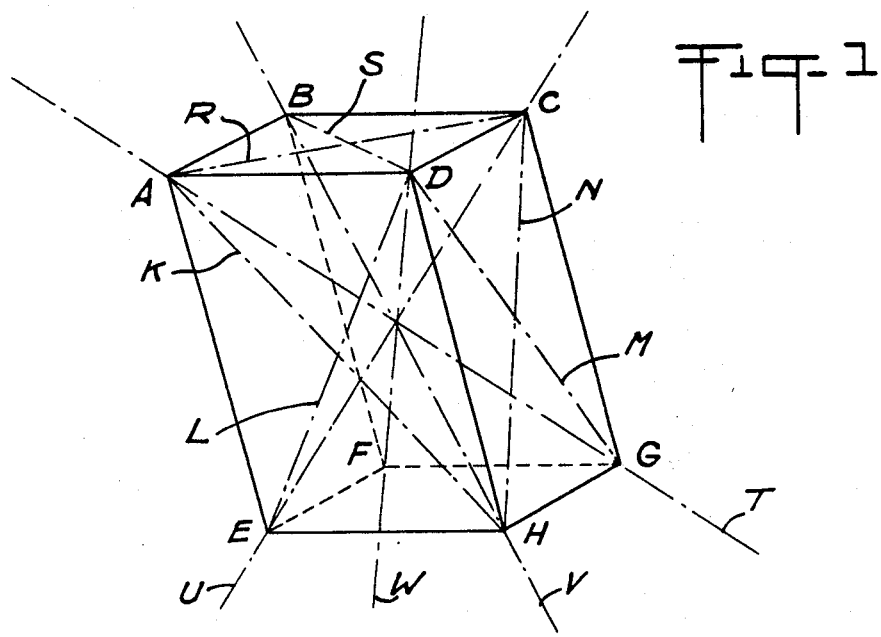
FIG. 1 shows different possible directions of the bundles of a structure according to the invention.

Referring now to the drawings, FIG. 1 makes it possible to situate, with respect to a reference parallelepiped of which the vertexes are designated A B C D E F G H, the ten directions along which the bundles constituting the structure will be disposed. T, U, V and W represent the four long diagonals respectively connecting the vertexes A–G, C–E, B–H and F–D and K, L, M, N, R and S represent the diagonals of the faces of the parallelepiped connecting A–H, D–E, D–G, C–H, A–C and B–D, respectively.

The following figures show the manner in which the elements constituting the structure are concretely disposed parallel to the directions thus defined. It is, in fact, obvious that several elements cannot interfere at the same point in space and that they must therefore be suitably offset so that, at the most, they are in contact. For example, if an element of the bundle directed along L has its axis merged with line ED, materially, there cannot be an element of the bundle directed along K which has its axis merged with the line AH. More precisely, if the bundles L and K are constituted by identical elements of diameter d, the axes of the elements L and K must be respectively in planes parallel to the face A D H E distant by at least d.

In the examples illustrated in FIGS. 2 to 9, the reference parallelepiped is a rectangular parallelepiped and even a cube in the case of FIGS. 2 to 7 and 9. However, the invention is not limited to the cases of the reference parallelepiped being a rectangular parallelepiped.

Figure 2:
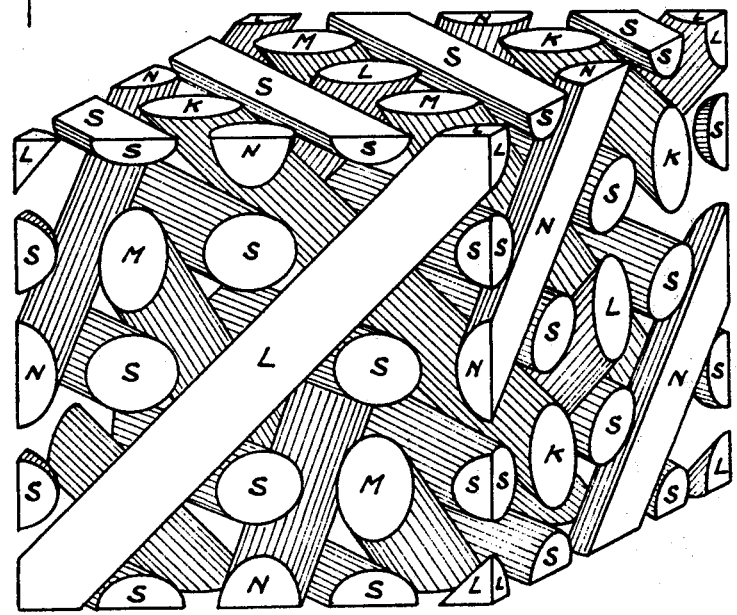
FIG. 2 shows a unit cell of a 5D structure according to the invention.

FIG. 2 shows the cubic unit cell of a structure with five directions according to the invention.

In this Figure and in the following, each reinforcing element (or each piece of element) is identified by a letter which corresponds to one of the ten directions marked on the reference parallelepiped of FIG. 1.

In the five-direction structure of FIG. 2 are found elements L and K parallel to the diagonals of the front face, elements N and M parallel to the diagonals of the side face and elements S parallel to one of the diagonals of the upper face.

Figure 3:
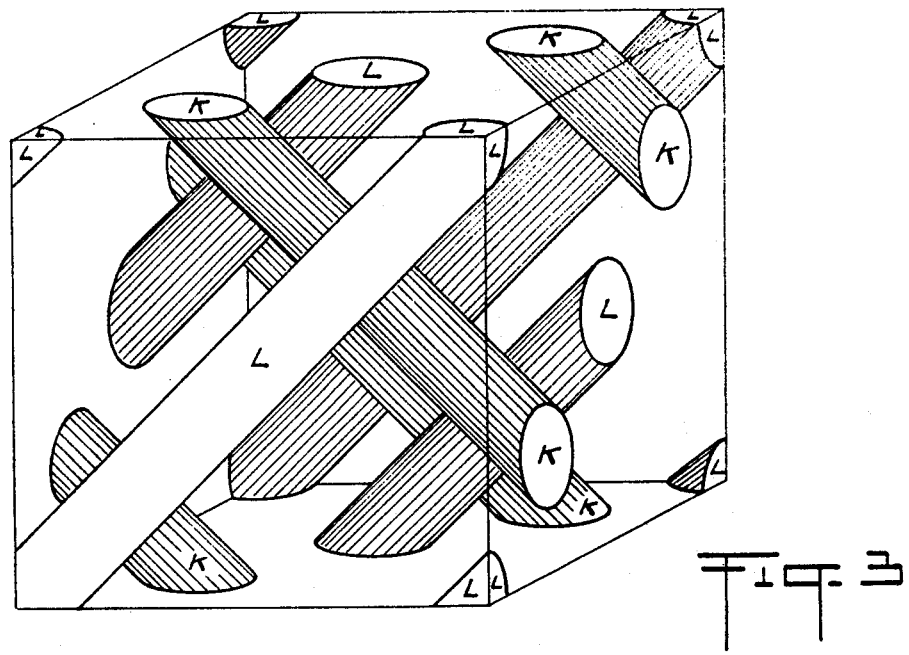
FIGS. 3 to 5 show the arrangements of the elements of the different bundles in the cell illustrated in FIG. 2.

For greater clarity, FIG. 3 shows the arrangement in space of only elements L and K of this structure to show how these elements are regularly offset and alternated in planes parallel to the front face, the spacing between planes being such that there is no interference between these elements.

Figure 4:
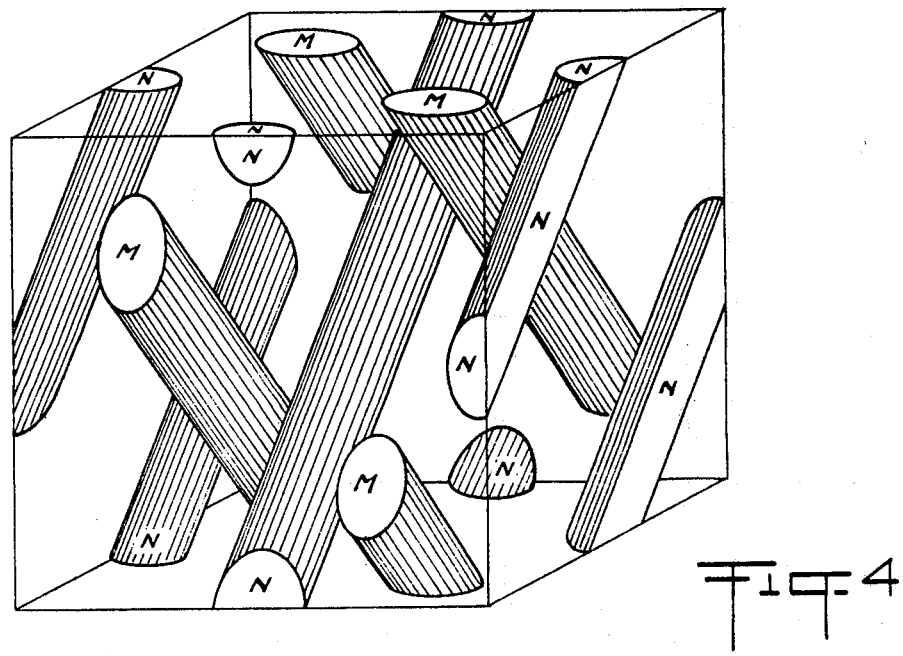

FIG. 4 similarly shows the arrangement in space of only elements N and M of this same structure to show that these elements are disposed in similar manner, so that they do not interfere.

Figure 5:
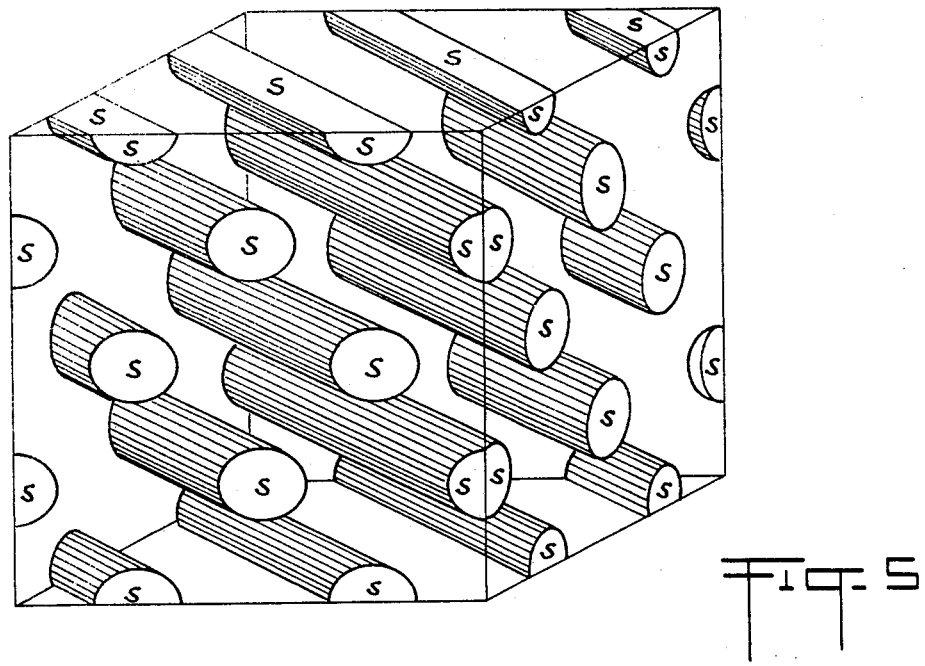

Finally, FIG. 5 shows the arrangement of elements S which are located in the free spaces between the elements L, K, N and M of the four preceding bundles.

A structure made of five bundles disposed according to the invention enables the volume content of 0.54 to be attained when all the elements which constitute it are cylindrical with circular cross section and all have the same diameter.

Figure 6:
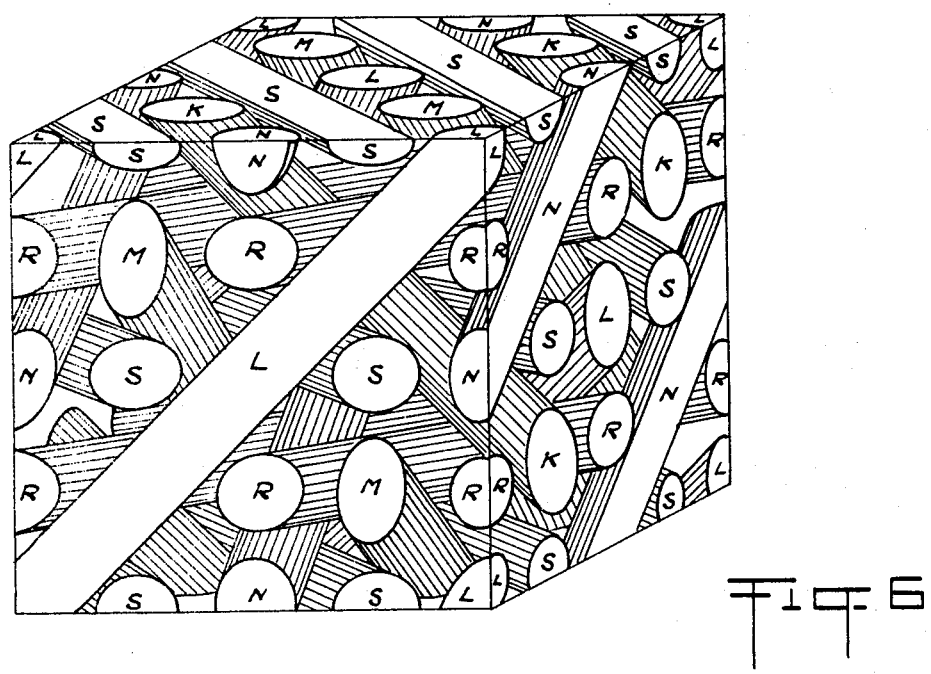
FIG. 6 shows a unit cell of 6D structure according to the invention.

FIG. 6 shows the cubic unit cell of a six-direction structure according to the invention.

Figure 7:
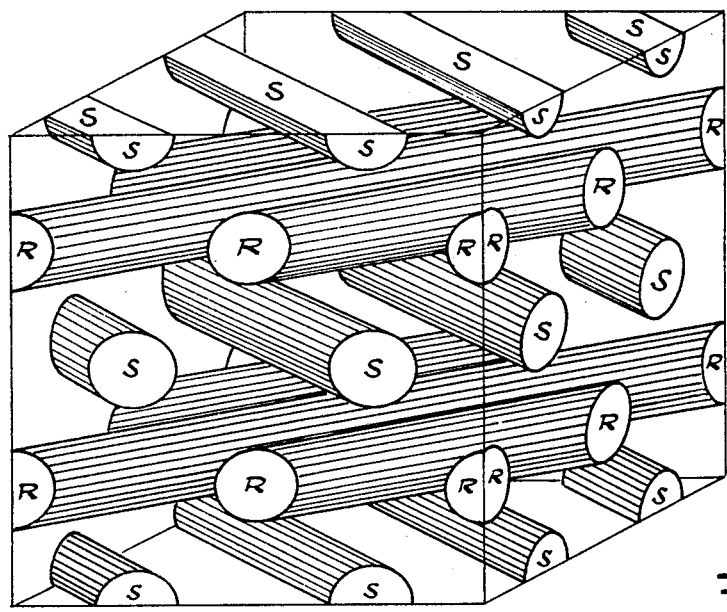
FIG. 7 shows the arrangement of elements of two bundles in the cell illustrated in FIG. 6.

It is obtained by the combination of elements L and K parallel to the diagonals of the front face and such as shown in FIG. 3 with elements N and M parallel to the diagonals of the side face and such as shown in FIG. 4 and with elements R and S parallel to the diagonals of the upper face and such as shown in FIG. 7.

Figure 8:
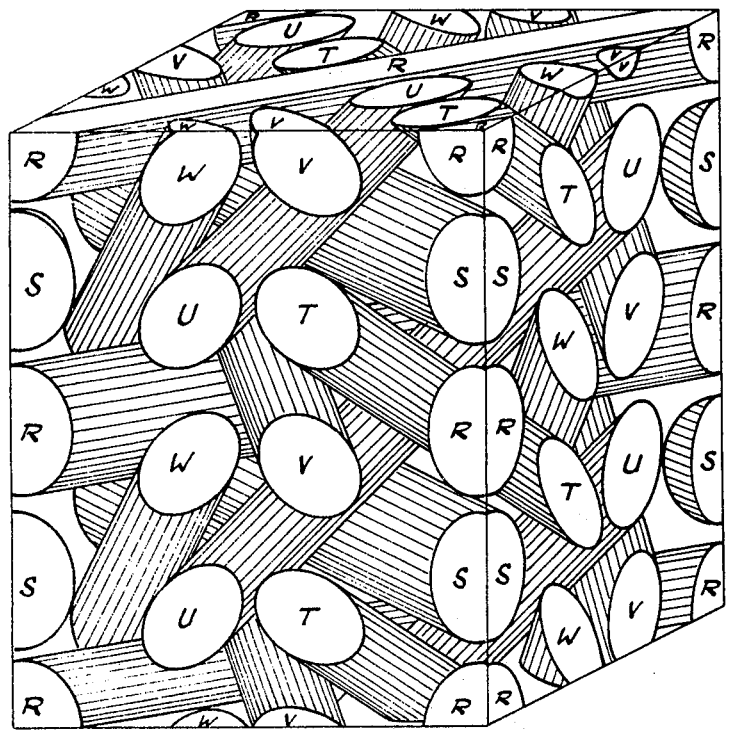

FIG. 8 shows another embodiment of a six-direction structure according to the invention. This structure is obtained by the combination of four bundles parallel to the four long diagonals of the parallelepiped T, U, V and W with two bundles parallel to the diagonals of its upper face S and R.

It will be noted that FIG. 8 shows two superposed unit cell.

In the case of FIG. 8, the elements of the bundles S and R have a diameter greater than that of the elements of the four other bundles, this enabling a volume content close to 0.65 to be attained. This value is relatively high for a structure comprising as large a number of bundles. This 6D structure therefore constitutes a particularly advantageous embodiment of the invention when a high volume content of reinforcement is sought in the structure.

However, this 6D structure is made by means of elements of different sizes, of which the directions are not uniformly distributed in space. In fact, four bundles are oriented along the four long diagonals of the parallelepiped but the other two bundles are formed of elements of larger cross section, oriented along two diagonals of a face of the parallelepiped.

FIG. 9 illustrates, on the contrary, a well balanced virtually isotropic 6D structure which constitutes another particularly advantageous embodiment of the invention when a quasi-perfect isotropy of the mechanical and physical properties of the structure is sought.

The six bundles of this 6D structure are formed by identical elements and are oriented along the six directions of the diagonals of the faces of a cube. FIG. 9 illustrates the cubic unit cell of this structure formed of elements K, L, M, N, R, S.

In the example illustrated, the elements have a circular cross section and a diameter equal to $(\rho/3\nu)\rho$ being the length of the edges of the unit cell.

The volume content of elements in the structure is equal to about 0.49.

It should be noted that the six bundles of the well balanced 6D structure are strictly equivalent, each of them being perpendicular to another bundle and forming an angle of 60° with each of the other four bundles. This well balanced 6D structure is the 6D structure presenting the highest degree of isotropy.

The examples described hereinabove must be considered only as a selection of a few embodiments of the invention. Their sole purpose was to show how such a structure may be made in practice and how it is possible to combine the various directions by using, for the various bundles, identical or different elements.

Of course, other embodiments of structure according to the invention may be envisaged, still by disposing bundles parallel to the lines connecting the non-contiguous vertexes of a parallelepiped in two's, these lines defining ten directions oriented like the four long diagonals of the parallelepiped and the six diagonals of its faces.

Thus, according to another embodiment of a five-direction structure according to the invention, four bundles are oriented like the four long diagonals of the parallelepiped and the fifth is oriented like a diagonal of one of the faces.

According to another embodiment of a six-direction structure according to the invention, four bundles are oriented like the diagonal of two non-parallel faces of the parallelepiped and the other two like two of its four long diagonals.

To construct a seven-direction structure according to the invention, four bundles are for example oriented like the diagonals of two non-parallel faces of the parallelepiped, two others being oriented like two of its four long diagonals and the seventh like a diagonal of a face not parallel to the first two.

In the case of an eight-direction structure according to the invention, four of the eight bundles may be oriented like the diagonals of two non-parallel faces of the parallelepiped and the other four, like its four long diagonals.

According to another embodiment of an eight-direction structure according to the invention, six of the bundles are oriented like the diagonals of three non-parallel faces of the parallelepiped and the other two like two of its four long diagonals.

A structure according to the invention may even comprise ten bundles of which four are oriented like the four long diagonals of the parallelepiped and the other six like the diagonals of three of its non-parallel faces.

In the preceding examples, the structure comprises only bundles oriented along at least five of the ten directions defined hereinabove. By way of variant, the structure may further comprise at least one supplementary bundle of which the direction is not parallel to any of these ten directions.

A supplementary bundle may for example be oriented parallel to line connecting a vertex of the parallelepiped to a point of an edge thereof, particularly a point distant from one of the vertex limiting this edge by a length equal to a whole fraction of the length of the edge. This point is preferably the centre of the edge.

A supplementary bundle may also be oriented parallel to a line connecting a vertex of the parallelepiped to the centre of any one of its faces.

A particular application of the structure according to the invention is their use as reinforcing structures in composite materials the voids between the elements of the structure being filled with a matrix to constitute the composite material.

When the composite material is intended for high temperature applications, for example for nozzles of solid propellant rockets or nose tips of rentry vehicles, the material chosen for the reinforcing structure and for the matrix may be carbon. a composite material of the carbon-carbon type is then obtained. The structure is formed by the assembly of carbon rods and the carbon matrix is made by a known technique, for example the technique of impregnation by a liquid resin followed by the polymerization and pyrolysis of the resin, or the technique of chemical vapor deposition by infiltration and cracking of a gaseous hydrocarbon. Reference may be made to French Pat. No. 2,276,916.

However, the application of the structure according to the invention is not limited to the production of carbon-carbon composite materials. According to the application envisaged, other materials may be used for making the elements of the structure.

What is claimed is:

1. A multi-directional structure comprising more than four bundles each constituted by a plurality of regularly spaced, parallel, rectilinear elements, the directions of at least five of said bundles being oriented parallel to at least five of the ten directions defined by the lines connecting the non-contiguous vertexes of a parallelepiped in two's and the bundles taken in three's not constituting a system in which each bundle is perpendicular to the other two.

2. A structure as set forth in claim 1, comprising five bundles of which four are oriented like the diagonals of two non-parallel faces of the parallelepiped and of which the fifth is oriented like a diagonal of a third face not parallel to the preceding ones.

3. A structure as set forth in claim 1, comprising five bundles of which four are oriented like the four long diagonals of the parallelepiped and of which the fifth is oriented like a diagonal of one of the faces.

4. A structure as set forth in claim 1, comprising six bundles oriented like the diagonals of the faces of the parallelepiped.

5. A structure as set forth in claim 1, constituted by six bundles oriented like the diagonals of the faces of a cube.

6. A structure as set forth in claim 1, comprising six bundles of which four are oriented like the diagonals of two non-parallel faces of the parallelepiped and the other two like two of its four long diagonals.

7. A structure as set forth in claim 1, constituted by six bundles of which four are oriented like the four long diagonals of the parallelepiped and the other two like the two diagonals of one of the faces, the elements of said other two bundles having a cross section larger than that of the elements of the other four bundles.

8. A structure as set forth in claim 1, comprising seven bundles of which four are oriented like the diagonals of two non-parallel faces of the parallelepiped, two others being oriented like two of its four long diagonals and the seventh like a diagonal of a face not parallel to the first two.

9. A structure as set forth in claim 1, comprising eight bundles of which four are oriented like the diagonals of two non-parallel faces of the parallelepiped and the other four like its four long diagonals.

10. A structure as set forth in claim 1, comprising eight bundles of which six are oriented like the diagonals of three non-parallel faces of the parallelepiped and the other two like two of its four long diagonals.

11. A structure as set forth in claim 1, comprising ten bundles of which four are oriented like the four long diagonals of the parallelepiped and the other six like the diagonals of three of its non-parallel faces.

12. A structure as set forth in claim 1, comprising at least one bundle of which the direction is not parallel to any of said ten directions.

13. A structure as set forth in claim 12, in which said bundle is parallel to a line connecting a vertex of the parallelepiped to the centre of any one of its edges.

14. A structure as set forth in claim 12, in which said bundle is parallel to a line connecting a vertex of the parallelepiped to the centre of any one of its faces.

15. A structure as set forth in claim 1, in which the parallelepiped is a rectangular parallelepiped.

16. A structure as set forth in claim 1, in which the parallelepiped is a cube.

17. A structure as set forth in claim 1, in which the parallelepiped constitutes the unit cell of the structure.

* * * * *

UNITED STATES PATENT AND TRADEMARK OFFICE
CERTIFICATE OF CORRECTION

PATENT NO. : 4,219,597  
DATED : August 26, 1980  
INVENTOR(S) : MICHEL MAISTRE

Page 1 of 2

It is certified that error appears in the above-identified patent and that said Letters Patent are hereby corrected as shown below:

Column 1, line 23, after "as" insert --a--;

line 57, after "three-dimensional", insert --,--.

Column 2, line 24, change "in" to --of--;

line 35, after "in" insert --an--.

Column 3, line 8, change "." to --;--;

line 10, after ";" insert --and--.

Column 4, line 18, change "cell." to --cells.--;

line 21, change "this" to --thus--;

line 46, change "($p/3v$)" to --$\ell/3v, \ell$--.

UNITED STATES PATENT AND TRADEMARK OFFICE
CERTIFICATE OF CORRECTION

PATENT NO. : 4,219,597

DATED : August 26, 1980

INVENTOR(S) : MICHEL MAISTRE

It is certified that error appears in the above-identified patent and that said Letters Patent are hereby corrected as shown below:

Column 5, line 38, after "to" insert --a--;

line 47, change "their" to --its--;

line 48, after "materials" insert --,--;

line 55, change "a" to --A--.

Signed and Sealed this

Seventeenth Day of February 1981

[SEAL]

Attest:

RENE D. TEGTMEYER

Attesting Officer

Acting Commissioner of Patents and Trademarks